*N. Bangs Williams.*
*Improvement in Oil Cups*
*Lubricators.*
75100
*Figure 2. Amended.*
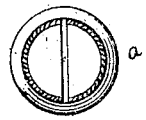
Top View.
PATENTED
MAR 3 1868
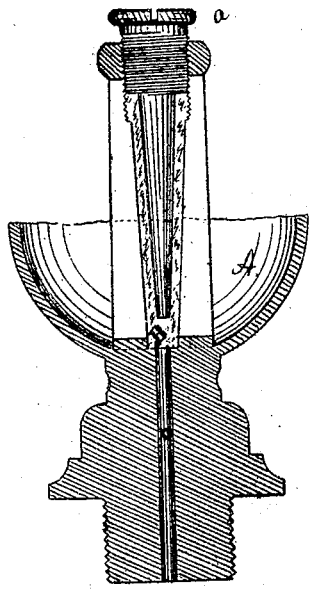
*Figure 1. Amended.*
Sec. Elevation
*Inventor*
N. Bangs Williams
Per B. F. Thurston
Attorney of Record
By Wm. C. Wood, Associate Atty.
Witnesses
Edmund Mason
R. L. Ross Jr.

United States Patent Office.

N. BANGS WILLIAMS, OF PROVIDENCE, RHODE ISLAND.

Letters Patent No. 75,100, dated March 3, 1868.

IMPROVEMENT IN OIL-CUPS.

The Schedule referred to in these Letters Patent and making part of the same.

TO ALL WHOM IT MAY CONCERN:

Be it known that I, N. BANGS WILLIAMS, of the city and county of Providence, in the State of Rhode Island, have invented a certain new and useful Improvement in Oil-Cups for lubricating machinery; and I do hereby declare that the following specification, taken in connection with the drawings, making a part of the same, is a full, clear, and exact description thereof.

My invention consists in combining with a chamber containing a suitable fibrous absorbent, through which absorbent the oil must flow, in its passage to the part of the machinery to be lubricated, a conical or tapering compressing-plug, arranged to act upon the absorbent in such way that the density of the mass can be regulated at pleasure, to vary the rate at which the oil shall be transmitted through it, and is particularly adapted to pillow-blocks, spindle-bolsters, &c.

The mere use of an absorbent and a compressing-plug, in connection with an oil-chamber, is known to me to have been used before, and is therefore not claimed by me. The peculiar form of my compressing-plug is new and valuable, as by its movement downward the density of the packing or absorbent is increased, by a lateral as well as a perpendicular pressure, and working nearly the same variation as to the flow of oil, by a single turn of the screw, as would be effected by many turns of the screw in any of the before-known forms of plug used in the same connection. In the amended drawing—

Figure 1, A represents the reservoir for oil; B, a chamber in which the fibrous absorbent is placed. The ducts through which the oil passes from A to B, are clearly shown, being, in this instance, perpendicular slots. $b$ is the conducting-tube or passage, through which the oil flows to the lubricating part. $a$ is the conical or tapering plug, wherein my improvement rests.

Figure 2 is a top view thereof.

I claim as my own invention—

The tapering compressing-plug $a$, in combination with a chamber, B, containing a fibrous absorbent, for the purposes specified.

N. BANGS WILLIAMS.

Witnesses:
JOHN D. THURSTON,
WILLIAM W. RICKARD.